June 25, 1946.  C. S. WARNER  2,402,715
GAUGE
Filed Nov. 2, 1943
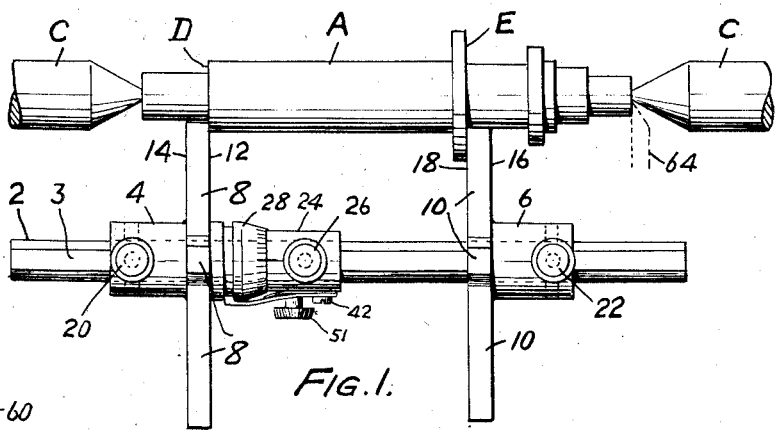
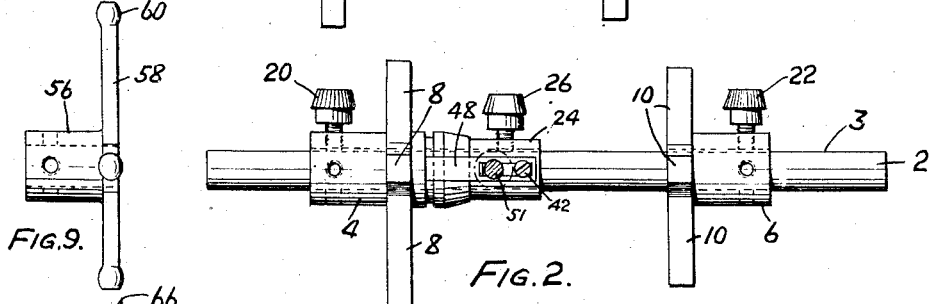
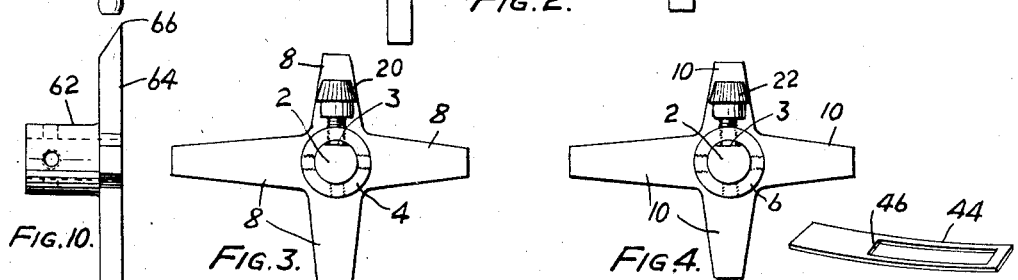
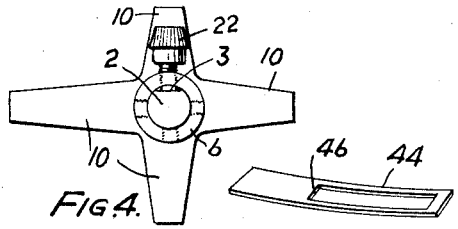
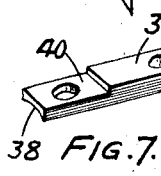
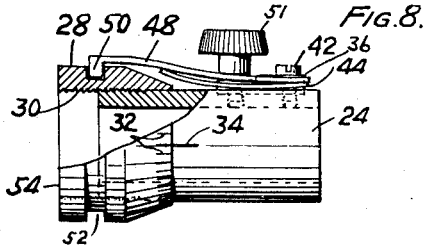
WITNESS:
Robt R Kitchel
INVENTOR
Charles S. Warner
BY
ATTORNEYS.

Patented June 25, 1946

2,402,715

UNITED STATES PATENT OFFICE 2,402,715

GAUGE

Charles S. Warner, Wilmington, Del.

Application November 2, 1943, Serial No. 508,695

3 Claims. (Cl. 33—165)

This invention relates to a gauge designed in particular for accurate measurements between offset shoulders of devices being machined or ground.

Accurate measurements of distances between shoulders which are offset with respect to each other are attended with considerable difficulty, since they must generally be effected indirectly by setting up the work on a plate and then making measurements by means of a height gauge or by the use of a dial gauge referred to standard blocks or the like, inasmuch as the screw or vernier micrometer cannot be used in view of the offset nature of the shoulders which precludes the line of measurement from being parallel to the base along which measurements are to be taken. Measurements thus indirectly made are particularly difficult in connection with work which is mounted between centers or in chucks or collets in lathes, since for measuring purposes it is then necessary to remove the work unless measurements are made with dial gauges or the like involving utilization of the lathe carriage generally in some fashion which will disturb the tool position.

The major object of the present invention is the provision of a gauge by the use of which accurate measurements may be made under difficult conditions to an accuracy of the order of one thousandth of an inch, the gauge being used in conjunction with screw micrometers or vernier calipers for this purpose.

Further objects of the invention relates to the provision of such a gauge capable of other uses as well, and also to the provisions of a gauge of such type susceptible to fine adjustment to secure with certainty the accuracy of measurement just indicated.

These, and other objects of the invention, will become apparent from the following description read in conjunction with the accompanying drawing in which Figure 1 is a plan view illustrating the improved gauge and its application to work located between lathe centers;

Figure 2 is an elevation of the gauge illustrated in Figure 1;

Figures 3 and 4 are end elevations of movable elements of the gauge;

Figure 5 is an elevation partly in section showing a micrometer adjusting means forming part of the gauge;

Figure 6 is a plan view of the same, partially in section;

Figure 7 is a perspective view of a part of the assembly of Figures 5 and 6;

Figure 8 is a perspective view of a spring member forming part of the assembly of Figures 5 and 6; and Figures 9 and 10 are plan views illustrating alternative members to be incorporated in the gauge for special work.

Referring first to Figure 1, there is illustrated therein a typical piece of work A, measurement of which by conventional gauges is impractical to any high degree of accuracy without removal of the work from the support centers C of the lathe. This work is illustrated as involving a shoulder D and the face E of a flange between which, for example, there is to be obtained a measurement of axial spacing to a high degree of accuracy. As will be evident from the figure, the surfaces between which measurements are to be made do not overlap each other axially, so that it will be evident that an ordinary screw micrometer or vernier caliper cannot be used inasmuch as to engage the surface it would have to be tilted with respect to the center line of the work, and hence, could not give accurate readings. Accordingly, the accurate measurement of the distance just indicated would ordinarily involve indirect measurements requiring computation or the removal of the work from its position between centers. It will be evident that similar problems arise in connection with work being machined on shapers or planers or being ground or otherwise formed.

The gauge provided in accordance with the invention for solving this problem comprises an accurately ground cylindrical rod 2 of sufficient rigidity for the purpose, provided with a flat indicated at 3. Mounted on this rod are members comprising sleeves or hubs 4 and 6 provided with ground or reamed bores accurately fitting the rod 2 and slidable thereon, and provided with a series of arms 8 and 10 of which, in the present instance, there are four provided on each sleeve. The arms 8 and 10 are faced at 12, 14, 16, and 18 to a high degree of accuracy with some known spacing between the faces 12 and 14, and 16 and 18.

The arrangement of the arms is subject to substantial variation, but preferably these are so arranged, as indicated in Figures 3 and 4, that by adjustment of pairs of arms of the respective members to oppose each other, radial differences may be secured in steps of, for example, a sixteenth of an inch. Two of the arms on the two members are desirably of the same length so that measurements may also be made between shoulders or surfaces which do overlap, as viewed in the direction of the measurement to be made. As examples of arms suitable for quite general application, one of the members may have its arms formed with lengths of one inch, 7/8 inch, 3/4 inch, and 9/16 inch, from the outside of its hub, while the other may have arms of lengths one inch, 13/16 inch, 5/8 inch, and 1/2 inch from its hub of similar outside diameter. As will be evident from these figures, the proper relative adjustments of the members will give a wide range of pairs of arms differing in lengths by steps of 1/16 of an inch.

The hubs 4 and 6 are provided with tapped holes at 90° positions as illustrated for the reception of clamping screws 20 and 22 to secure the members in position on the rod 2 by engagement with the flat 3.

With the gauge elements so far described, it will be evident that, with the axis of the rod 2 arranged parallel to the direction in which measurement is to be taken, for example the line of centers of a piece being turned in a lathe, a suitable pair of arms may be engaged with shoulders of different projections from the line of measurement to provide a feeler gauge arrangement which, after removal from the work, may have the spacing of its arms accurately measured by a suitable micrometer. If the outside spacing of the arms is measured by the micrometer, this will give directly the spacing between the shoulders if inside measurements are made. The micrometer measurement less twice the known thickness of the arms will give the measurement between the shoulders if an outside measurement is being made. Similarly the micrometer measurement less the known thickness of one arm will give the spacing between shoulders if an outside-inside measurement is made.

While with the rod 2 and the members comprising the sleeves 4 and 6 and their arms, such measurements may be made to a high degree of accuracy by the careful use of the gauge, it is quite generally desirable, for example where subsequent cuts are to be made, to be able after a first measurement to accurately adjust the gauge so as to prepare it to act as a feeler gauge for the completed work. For this purpose it is desirable to provide, additionally, the element illustrated in Figures 5 and 6.

This last element comprises a sleeve 24 having an accurately ground or reamed bore therein slidably fitting the rod 2 and adapted to be clamped thereon by a screw 26 engaging the flat 3. Threaded on one end of the sleeve 24 is a nut 28, the threads indicated at 30 being accurately formed in the fashion of micrometer threads, conveniently, for example, 40 to the inch. The nut 28 is provided with graduations 32, preferably twenty-five in number, readable against a scribed line 34 on the sleeve 24, which line for convenience of reference may be duplicated on the opposite side of the sleeve. The end faces of the sleeve 24 and the nut 28 are accurately finished, as are also the end faces of the members provided with the arms 8 and 10.

To secure fixed accurate adjustment, the sleeve 24 has secured thereto by means of a screw 42 a block 36 having an inside surface curved at 38 to fit the exterior cylindrical surface of the sleeve 24. This block 36 is provided with a depression 40. Embracing the block is a curved spring 44 provided with an opening 46 of rectangular shape fitting the block, the spring being arranged to engage a locking member 48 provided with a rectangular opening laterally engaging the block 36 but of a somewhat greater length than the block so as to permit axial movement. This member 48 is provided with a hook end engageable in an annular slot 52 in the nut 28. A shouldered screw 51 threaded into the sleeve 24 has a shoulder wider than the slot in the member 48 so that when it is threaded inwardly the member 48 will have its hook 50 clamped in the slot 52 to prevent the turning of the nut 28, the sufficient flexure of the member 48 for this purpose being permitted by the clearance afforded by the cutaway or depressed portion 40 of the block 36.

Referring again to Figure 1, the use of the assembly of Figures 5 and 6 will be understood therefrom. Suppose, for example, the shoulder D is being machined and is to have an accurate axial spacing from the face E of the flange. With the sleeve 24 in loose position on the rod 2, the proper arms 8 and 10 may be engaged with the two surfaces and locked in position. The assembly comprising the sleeve 24 with the nut 28 blocked may then be moved to abut the faces 12 of the arms 8 and the assembly then locked in position on the rod 2 by means of the screw 26. The gauge may now be removed from the work and measurement made with a micrometer which, at this point, may indicate the necessity for removing from the shoulder D a few thousandths of an inch.

In order to adjust the gauge to act as a final feeler, the screw 51 is now backed out to release the nut 28 which may be retracted to the extent of the required thousandths of an inch to be removed and then reclamped in position by the screw 51. The sleeve 24 may then be released by freeing the screw 20 and then moved again into contact with the nut 28 and clamped in position. If desired, the new position may be checked with a micrometer to ascertain whether, in fact, the gauge is now set to act as a feeler for the sufficiency of the final cut. If extreme care is required, the gauge may, of course, be set still slightly in excess of the final dimension so that the cut may first be taken to secure a very close approximation to the required dimension, whereupon the gauge may be again adjusted in similar fashion to a final position. It will be obvious that by various arrangements of the assembly of Figures 5 and 6, fine outside, inside, and outside-inside measurements may be made.

It sometimes happens that the gauge may be required to fit into a close position which will not admit of the use of the square ends of the arms 8 and 10 as heretofore described. Under such conditions one or both of the members may be replaced by a member such as illustrated in Figure 10 comprising a hub 62 and arms 64 which, in this case, have beveled ends 66. As an example of the use of such a member, there is illustrated at the right-hand portion of Figure 1 the use thereof to secure a measurement to the small diameter end of work held in the lathe center. Similar uses of this last type of member occur where there is a quite small groove involved in the work, from a shouldered surface of which measurement is to be made. It will be evident that the micrometer measurement may be made between the radial surfaces of the arms of the members of Figure 10.

It is also desirable to provide in conjunction with the gauge, members such as indicated in Figure 9, each comprising a hub 56 carrying arms 58 ending in accurately formed knobs 60 of circular section for the purpose of accurate measurement of bores, the inside diameters of which are to be measured or the spacing between the inside surfaces of which are to be measured with respect to flat portions of the piece.

A further use of the gauge described is that of making height measurements, in which case one of the members may have its arms brought flush with the end of the rod 2 so as to support it upon a face plate or the like. It will be evident that with the device illustrated, the ingenuity of the user will make it applicable to a very large number of situations otherwise difficult of measurement. For example, the arrangement just described for a height gauge may be transformed to a depth gauge by removing the member which, in the preliminary setting, was flush with the end of the rod.

It frequently happens that a small shop might not have a micrometer or vernier gauge capable of measuring accurately beyond certain ranges. Under such circumstances there may be provided a quite long rod 2 and a set of three members provided with arms as above described in conjunction with a pair of assemblies such as 5 and 6. With this arrangement, it will be obvious that by such use of three members and the micrometer adjustments afforded by the assemblies, a micrometer of a limited range may, by successive measurements between members, be used to provide a feeler gauge having a span up to twice the range of the micrometer. Further multiplication of the elements may increase this range still more. Alternatively, two members having arms may be used with the member 24 outside the pair and used as a reference for measurements and as a stop successively, thereby to extend the range.

The use of three or more members on a single rod is also advantageous where it is desired to make two or more measurements on the same piece of work.

It will be obvious that various changes may be made in the specific embodiment of the invention and, in particular, with respect to the specific construction of the assembly of Figures 5 and 6 without departing from the scope of the invention as defined in the following claims.

What is claimed is:

1. A gauge comprising a rod and a plurality of members carried by the rod, at least one of said members being adjustable along the rod, and each of said members being provided with a plurality of arms of different lengths at least one of said members being adjustable about said rod to bring into axial alignment various pairs of arms of the two members.

2. A gauge comprising a rod, a plurality of members carried by the rod, at least one of said members being adjustable along the rod, and each of said members being provided with a plurality of arms of different lengths, at least one of said members being adjustable about said rod to bring into axial alignment various pairs of arms of the two members, and fine adjusting means carried by the rod comprising an element arranged to be secured to the rod, and a second element threaded to the first element for adjustment relative thereto and arranged to abut the member adjustable along the rod.

3. A gauge comprising a rod, a plurality of members carried by the rod, at least one of said members being adjustable along the rod, and each of said members being provided with a plurality of arms of different lengths, at least one of said members being adjustable about said rod to bring into axial alignment various pairs of arms of the two members, and fine adjusting means carried by the rod comprising an element arranged to be secured to the rod, a second element threaded to the first element for adjustment relative thereto and arranged to abut the member adjustable along the rod, and means for locking the adjustable element against rotation.

CHARLES S. WARNER.